Aug. 6, 1940.    R. H. SHEPPARD    2,210,345
FUEL LINE CONNECTION
Filed Sept. 1, 1938
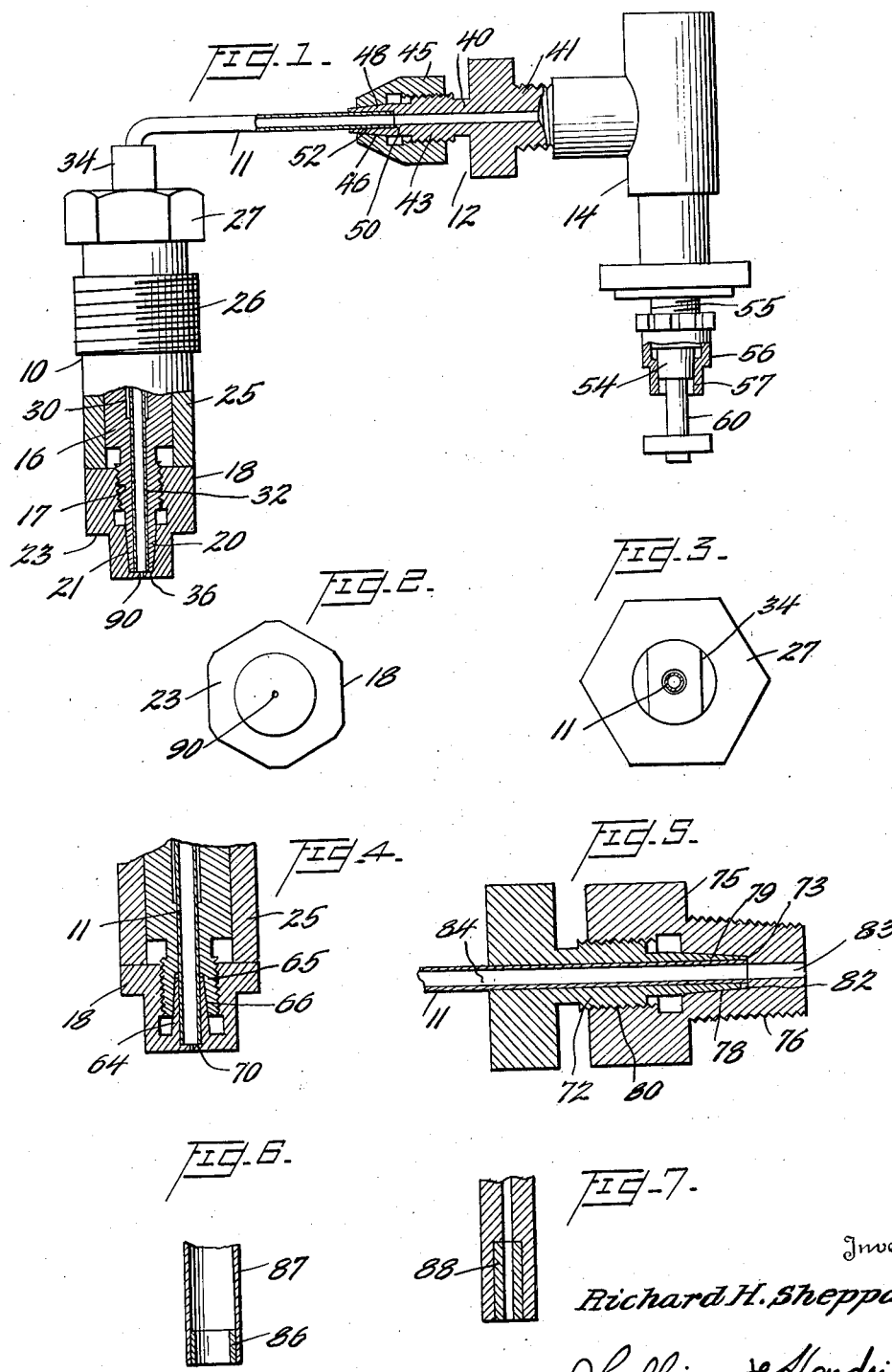

Patented Aug. 6, 1940

2,210,345

UNITED STATES PATENT OFFICE 2,210,345

FUEL LINE CONNECTION

Richard H. Sheppard, Hanover, Pa.

Application September 1, 1938, Serial No. 228,069

1 Claim. (Cl. 285—48)

This invention relates to connectors particularly for tubing and has for its general object a simplified means and method for removably connecting cylindrical objects, such as rods and tubes to other bodies. More particularly it is an object of this invention to provide an easily manipulated connector for all kinds of tubing for example such as used in high pressure hydraulic systems for machine tools, in refrigerator systems, in oil burners or in domestic water systems.

Although the invention relates to tubing connections in general, for purposes of clear explanation I shall describe it as developed for small size tubing and specifically for high pressure oil lines used on Diesel type engines and as thus employed my invention has for its principal object the provision of very simple and quite inexpensive fuel lines having fewer but more efficient connections than can be provided according to present practice. A particular object is to provide a tubing connector which is substantially free of even minute air pockets.

A further object is to provide a tubing connection that has only two parts and which will take ordinary stock tubing without threading, reshaping or working of any kind and make a reliable fluid-tight coupling and without soldering, brazing or welding. Still another object is the provision of a tubing connector which may be easily and quickly assembled and taken apart and to or from which disassembled parts the ends of ordinary stock tubing may be inserted or removed by hand.

A still further object is the provision of a fuel injector having my simple tube connector as a principal part so that the entire fuel line from the pump to the nozzle of the injector may be more free of air pockets than is possible in old designs.

An important object of my invention is the employment of its basic principle to provide a compressible cylinder self-packing fuel injector pump whereby to eliminate the expensive process of lapping to produce the close fit of cylinder and piston required in high pressure fuel lines; the process of honing may also be avoided by the use of my invention. A further object is the provision of an adjustable diameter cylinder for use in fuel pumps so that the cylinder may be adjusted for wear or for off-size pistons.

My invention permits quick and easy repair or cleaning of fuel lines at points far remote from repair shops and in addition avoids the necessity for carrying other than stock tubing and furthermore reduces the number of tools required to be carried with the engine.

In carrying out my invention I provide a connector having a solid but compressible throat and means for compressing the throat on a tube inserted therein thus to make an efficient and reliable coupling. In my new connector the tube end face is preferably a plane and normal to the axis of the tube so as to seat squarely in the connector body leaving no space. In the preferred embodiment of my invention the closing of the connection forces or at least holds the tube end firmly against the seat thus making a tight seal free of air pockets. The reason I prefer that the end face of the tube be a plane and normal to the axis of the tube is that this type of face is more accurately and easily made than are other types of faces. In making the right angle face it is only necessary to cut the tube by holding the saw normal to the tube axis which is an operation that can be more accurately performed in the field than reaming or spinning processes. However, it is to be understood that a cooperating conical seat and similarly shaped tube end could be used in my invention providing the outside diameter of the tube end is not changed and even this is permissible where there is no likelihood of opening the connection.

In the drawing:

Figure 1 is a view of my new fuel line having an injector at one end in longitudinal section and a connector at the other end partly in section and coupled with my improved pump cylinder also partly in section.

Figure 2 is a nozzle end view of the injector.

Figure 3 is a top view of the injector.

Figure 4 is a fragmentary section of a modified form of the connection as used in an injector.

Figure 5 is a fragmentary section of a further modification of the invention as used in a connector.

Figure 6 is a fragmentary sectional view of a modified form of tube reinforcement.

Figure 7 shows a further method of reinforcing the tube.

In Figure 1 the injector 10 at the left is shown connected by a tube 11 with my improved tubing connector 12 which in turn is screwed into a pump 14, which pump is broken away in part to show the new compressible cylinder.

The injector consists of a body 16 threaded at 17 for screw engagement with a nozzle head 18 and has a tapered nose 20 fitting in a correspondingly shaped cavity 21 of the nozzle head; instead of a screw connection bolts may of course be used to force the parts together where space permits. The nozzle portion has a shoulder 23 adapted to engage a seat in the engine head when the cylindrical hold down nut 25, threaded at 26, is screwed into place by means of the hex head 27. The nozzle portion is preferably hexagonal in plan view but having rounded corners for engagement with the cylindrical wall of the bore leading to the nozzle seat; this construction prevents the nozzle from freezing into place and makes it easy to remove. The tube 11 is preferably spaced as at 30 for the major portion of the injector body but has a firm but manually slidable fit as at 32 extending through the nose. Most standard high grade tubing now comes with sufficiently uniform diameter to fit corresponding sized bores so that ordinarily the tubing does not need to be dressed down to fit a so-called standard sized bore.

When assembling the injector, the first step is to insert the end of the tubing 11 into the body 16 until the plane face of the tube end, which is as nearly normal to the axis of the tube as possible, is flush with the corresponding plane end of the nose 20, or the tube may extend slightly beyond the end of the nose. Now the body with the tube in place is screwed into the nozzle head by applying wrenches at 34 and 18. The dimensions of the body and nozzle head are such that the end of the tapered nose 20 engages the seat 36 at the same time that the nose is squeezed against the tubing with sufficient force to hold the tubing in place against forces exerted by a 10,000 pounds pressure of the fuel line. I have discovered that the compression required is less than the elastic limit of a steel nose and also of the steel tubing used. If the compression is slightly greater than the elastic limit of the steel tubing no great harm is done since the only disadvantage resulting is that tube 11 cannot be pulled by hand from the body 16 after the removal of the nozzle head 18. However, the tube can be easily turned by hand in the body and may be removed by the exertion of a little more force than usually possible with the hands.

The connector 12 is removably connected with tube 11 by substantially the same means as used in the injector. Like the injector the connector consists of a body 40 having a threaded end 41 for screwing into another connector or to the pump 14 and has a threaded portion 43 for screwing into the nut 45 provided with a tapered bore 46 for receiving the corresponding tapered nose 48 of the body. In the injector the tube 11 extends entirely through the body whereas in the preferred embodiment of my connector the tube extends only through the nose portion and terminates near the base of the nose in an annular seat 50 against which it is firmly held while screwing the nut into place. As in the connector the bore 52 in the nose 48 is of a size to firmly fit a standard sized tubing which may be inserted by hand, so that a minimum amount of force is necessary to squeeze the nose into fluid-tight engagement with the tubing.

The pump cylinder 14, for convenience, is shown entirely separate from any piston actuating mechanism which may be of any desired construction and is not shown. The pump cylinder is of the usual design except that the lower end is tapered at 54 in much the same way as the injector and connector bodies. Above the tapered portion 54 is provided a threaded portion 55 for engagement with a compressing head 56 having a tapered cavity 57 for receiving the tapered end 54. With this construction the head 56 may be screwed onto the cylinder end to compress the tapered portion against the piston 60 to obtain any desired fit. This eliminates the necessity of lapping the piston in the cylinder bore and it often eliminates as well the necessity of honing the piston and cylinder. This adjustable cylinder has the added advantage of taking off-sized pistons, and, of course, when wear occurs the cylinder may always be squeezed down the amount necessary to compensate for the wear.

The degree of taper in each application is preferably that shown in the drawing, but the angle is not critical and may vary for different kinds of material and for different kinds of service. A steeper taper may be employed for less pressure on the tube. The best taper to use depends upon the material in the tube, the thickness of its walls and the material in the fittings as well as the particular application.

In Figure 4, a modification of the injector nozzle and body, the tapered nose portion 64 is integral with the nozzle head 18 and the body 65 is provided with the corresponding tapered cavity 66. In this modification tubing 11 always seats on the floor of the nozzle head as at 70, thus avoiding the danger of the parts moving out of proper relation while the body 65 is screwed into the nozzle head thereby insuring against minute air pockets between the seat and the tube end. The other parts of the injector of Figure 4 are the same as in Figure 1.

In Figure 5 the tube 11 extends substantially entirely through the connector body 72 and seats against the annular shoulder 73 of the connector nut 75 which nut also is threaded at 76 for screwing into another connector or into a pump. The nut 75 is provided with a tapered cavity 78 for receiving the tapered nose 79 of the connector body on which the nut is screwed by means of cooperating threads 80. In the preferred construction the tapered nose 79 also seats on the floor 73 of the nut but this seating is not necessary and an annular space 82 may be left between the nose end and the seat. The bore 83 of the nut is of the same diameter as the bore 84 of the tube with which it registers.

An injector improved with my invention permits the use of an unbroken fuel line from the very intake 83 of the connector to the nozzle orifice 90 of the injector.

Although I have described my connector as employing steel tubing it is, of course, understood that tubing of other metals may be employed successfully to make good mechanical and fluid-tight couplings. Where there is danger of crushing as when thin walled tubing is used, as for example copper tubing in domestic water systems, I insert a short steel sleeve 86 into the tube end 87 as shown in Figure 6. If the tubing is thick walled and of soft metal I may counterbore the end to receive the steel insert as shown at 88 in Figure 7; this as rarely necessary but with the tube end thus reinforced the nut may be screwed on to obtain the necessary fit without fear of setting or crushing the tube.

The body, or at least the tapered portion, of the connector (pump cylinder or injector) should be of elastic metal for best results, that is, so as to expand to release the tubing or piston when the bodies are unscrewed as well as to contract to grip the cylindrical insert when the bodies are screwed together. By elastic metal I mean a metal or alloy, such as steel or one having greater or less elasticity; for example bronze or brass. It is understood, of course, that the bore through the tapered nose contains at least one complete cylindrical surface and it is preferable that the nose be a solid although slots in the outer portion not passing through the bore surface may be used to advantage in some cases to increase the compressibility.

In any of the devices employing my invention the tube may be quickly pulled from its socket in the nose merely by unscrewing the cap which permits the nose to spring back to its normal diameter thus releasing the tube.

What I claim is:

A non-dribbling injector comprising a body having a bore snugly fitting a smooth outer surface metal tube, said body having a cylindrical portion to be engaged by a hold-down sleeve, a conical nose portion to be engaged by a nozzle head and a threaded portion spaced from the cylindrical portion and the nose portion, a nozzle head having threaded engagement with the body and having a conical recess of the same angle of slope as the nose of the body and having a perforated seat for the nose and the therein contained tube, said nozzle head and nose portion being of elastic metal so as to grip the tubing and force it against its seat in the nozzle head with sufficient force to hold the tubing in place against high pressure without deforming the body or head, whereby the tubing may be released for re-use by unscrewing the nozzle head from the body.

RICHARD H. SHEPPARD.